United States Patent
Gao et al.

(10) Patent No.: US 10,950,258 B1
(45) Date of Patent: Mar. 16, 2021

(54) SPIN TORQUE OSCILLATOR HAVING ONE OR MORE CHROMIUM INSERTION LAYERS FOR MAGNETIC RECORDING DRIVES

(71) Applicant: Western Digital Technologies, Inc., San Jose, CA (US)

(72) Inventors: Zheng Gao, San Jose, CA (US); Susumu Okamura, Fujisawa (JP); James Mac Freitag, Sunnyvale, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/883,911

(22) Filed: May 26, 2020

(51) Int. Cl.
*G11B 5/235* (2006.01)
*G11B 5/127* (2006.01)
*G11B 5/31* (2006.01)
*G11B 5/02* (2006.01)

(52) U.S. Cl.
CPC ............ *G11B 5/235* (2013.01); *G11B 5/1278* (2013.01); *G11B 5/314* (2013.01); *G11B 5/315* (2013.01); *G11B 5/3146* (2013.01); *G11B 5/02* (2013.01)

(58) Field of Classification Search
None
See application file for complete search history.

(56) References Cited

U.S. PATENT DOCUMENTS

| 8,687,319 | B2 | 4/2014 | Igarashi et al. | |
|---|---|---|---|---|
| 9,406,315 | B2 | 8/2016 | Shiimoto et al. | |
| 2009/0080106 | A1* | 3/2009 | Shimizu et al. | G11B 5/314 360/125.03 |
| 2009/0225465 | A1* | 9/2009 | Iwasaki et al. | G11B 5/1278 360/75 |
| 2010/0110592 | A1 | 5/2010 | Koui et al. | |
| 2012/0134048 | A1* | 5/2012 | Takeo et al. | G11B 5/3146 360/110 |

(Continued)

FOREIGN PATENT DOCUMENTS

| JP | 2012108981 A | 6/2012 |
|---|---|---|
| JP | 2018190795 A | 11/2018 |
| WO | 2015126326 A1 | 8/2015 |

OTHER PUBLICATIONS

Matsumoto, Yuki et al., "Large Negative Magnetic Anisotropy of W/Fe/W (001) Epitaxial Trilayers", IEEE Transactions on Magnetics, vol. 51, No. 11, Nov. 2015.

(Continued)

*Primary Examiner* — Craig A. Renner
(74) *Attorney, Agent, or Firm* — Patterson & Sheridan, LLP; Steven H. Versteeg (57) ABSTRACT

Aspects of the present disclosure relate to spin torque oscillator (STO) and methods, such as spin torque oscillators used in write heads of magnetic media drives. The STO includes a seed layer, a spin polarization layer (SPL), a spacer layer, a field generation layer (FGL), a capping layer. An insertion layer is disposed within the STO. The insertion layer increases the negative Hk. The insertion layer may be located between the FGL and the capping layer, as well as between the FGL and the spacer layer. For a reverse STO, the insertion layer may be disposed between the FGL and the seed layer, as well as between the FGL and the spacer layer.

21 Claims, 9 Drawing Sheets

(56) References Cited

U.S. PATENT DOCUMENTS

| | | | |
|---|---|---|---|
| 2012/0134054 A1* | 5/2012 | Takeo et al. | G11B 5/3146 360/110 |
| 2013/0229895 A1* | 9/2013 | Shiroishi et al. | G11B 5/3146 369/13.14 |
| 2013/0279039 A1* | 10/2013 | Shiroishi | G11B 5/607 360/48 |
| 2014/0104724 A1 | 4/2014 | Shiroishi et al. | |
| 2014/0146420 A1* | 5/2014 | Shimizu et al. | G11B 5/314 360/125.28 |
| 2015/0380022 A1* | 12/2015 | Koui et al. | G11B 5/3146 360/319 |
| 2017/0148474 A1* | 5/2017 | Okamura et al. | G11B 5/235 |
| 2017/0309301 A1* | 10/2017 | Takahashi et al. | G11B 5/3146 |
| 2018/0025746 A1* | 1/2018 | Okamura et al. | G11B 5/3146 360/125.3 |

OTHER PUBLICATIONS

Vas'ko, V. A. et al., "Magnetic anisotropy of (110) Fe / Co superlattices", American Institute of Physics, 2006.

Kikuchi, Nobuaki et al., "Influence of 5d transition elements on the magnetocrystalline anisotropy of hcp-Co", IOP Science, Nov. 1, 1999, pp. L485-L490.

Bosu, S. et al., "High frequency out-of-plane oscillation with large cone angle in mag-flip spin torque oscillators for microwave assisted magnetic recording", American Institute of Physics, Apr. 3, 2017, pp. 142403-1-142403-4.

Yoshida, Kazuetsu et al., "Spin Torque Oscillator With Negative Magnetic Anisotropy Materials for MAMR", IEEE Transactions on Magnetics, vol. 46, No. 6, Jun. 2010, pp. 2466-2469.

Takahashi, Migaku et al., "Magnetocrystalline Anisotropy for α'—Fe—C and α'—Fe—N Films", IEEE Transactions on Magnetics, vol. 37, No. 4, Jul. 2001, pp. 2179-2181.

\* cited by examiner

SPIN TORQUE OSCILLATOR HAVING ONE OR MORE CHROMIUM INSERTION LAYERS FOR MAGNETIC RECORDING DRIVES

BACKGROUND OF THE DISCLOSURE

Field of the Disclosure

Aspects of the present disclosure generally relate to spin torque oscillators and methods, and associated components thereof, such as spin torque oscillators used in write heads of magnetic media drives.

Description of the Related Art

The heart of the functioning and capability of a computer is the storing and writing of data to a data storage device, such as a hard disk drive (HDD). The volume of data processed by a computer is increasing rapidly. There is a need for higher recording density of a magnetic recording medium to increase the function and the capability of a computer.

In order to achieve higher recording densities, such as recording densities exceeding 2 Tbit/in$^2$ for a magnetic recording medium, the width and pitch of write tracks are narrowed, and thus the corresponding magnetically recorded bits encoded in each write track is narrowed. One challenge in narrowing the width and pitch of write tracks is decreasing a surface area of a main pole of the magnetic write head at a media facing surface. As the main pole becomes smaller, the writing field becomes smaller as well, limiting the effectiveness of the magnetic write head.

Heat-assisted magnetic recording (HAMR) and microwave assisted magnetic recording (MAMR) are two types of energy-assisted recording technology to improve the recording density of a magnetic recording medium, such as a HDD. In MAMR, a spin torque oscillator (STO) device is located next to or near the write element in order to produce a high-frequency AC field, such as in a microwave frequency band. The high-frequency AC field reduces an effective coercivity of a magnetic recording medium used to store data and allows writing of the magnetic recording medium at lower magnetic writing fields emanated from the write pole. Thus, higher recording density of the magnetic recording medium may be achieved by MAMR technology.

STOs can involve relatively inefficient magnetic recording and relatively low areal density capability (ADC) of magnetic recording as STOs oftentimes suffer from low oscillation angles at high oscillation frequencies.

Therefore, there is a need for STOs that simply and effectively increase oscillation angles at high oscillations frequencies to facilitate effective and efficient magnetic recording, and high ADC of magnetic recording.

SUMMARY OF THE DISCLOSURE

Aspects of the present disclosure relate to a spin torque oscillator (STO) and methods, such as spin torque oscillators used in write heads of magnetic media drives. The STO includes a seed layer, a spin polarization layer (SPL), a spacer layer, a field generation layer (FGL), a capping layer. An insertion layer is disposed within the STO. The insertion layer increases the negative Hk. The insertion layer may be located between the FGL and the capping layer, as well as between the FGL and the spacer layer. For a reverse STO, the insertion layer may be disposed between the FGL and the seed layer, as well as between the FGL and the spacer layer.

In one implementation, a write head includes a main pole, a trailing shield, and a spin torque oscillator (STO) coupled to the main pole and the trailing shield. The STO includes a seed layer on the main pole, a layer on the trailing shield, and a spin polarizing layer between the seed layer and the layer on the trailing shield. The STO also includes a field generating layer between the spin polarizing layer and the layer on the trailing shield, and a spacer layer between the spin polarizing layer and the field generating layer. The STO also includes one or more chromium layers between the seed layer and the layer on the trailing shield.

In one implementation, a write head includes a main pole, a trailing shield, and a spin torque oscillator (STO) coupled to the main pole and the trailing shield. The STO includes a seed layer on the main pole, a layer on the trailing shield, and a field generating layer between the seed layer and the layer on the trailing shield. The STO also includes a spin polarizing layer between the field generating layer and the layer on the trailing shield, and a spacer layer between the field generating layer and the spin polarizing layer. The STO also includes one or more chromium layers between the seed layer and the layer on the trailing shield.

In one implementation, a spin torque oscillator includes a seed layer, an end layer, a spin polarizing layer between the seed layer and the end layer, and a field generating layer between the seed layer and the end layer. The spin torque oscillator also includes a spacer layer between the spin polarizing layer and the field generating layer. The spin torque oscillator also includes one or more chromium layers disposed on one or more of the seed layer, the field generating layer, or the spacer layer. Each of the one or more chromium layers is of a thickness that is up to 80 Angstroms.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure relate to a spin torque oscillator (STO) and methods, such as spin torque oscillators used in write heads of magnetic media drives. The STO includes a seed layer, a spin polarization layer (SPL), a spacer layer, a field generation layer (FGL), a capping layer. An insertion layer is disposed within the STO. The insertion layer increases the negative Hk. The insertion layer may be located between the FGL and the capping layer, as well as between the FGL and the spacer layer. For a reverse STO, the insertion layer may be disposed between the FGL and the seed layer, as well as between the FGL and the spacer layer.

It is to be understood that the magnetic recording head discussed herein is applicable to a data storage device such as a hard disk drive (HDD) as well as a tape drive such as a tape embedded drive (TED) or an insertable tape media drive. An example TED is described in co-pending patent application titled "Tape Embedded Drive," U.S. application Ser. No. 16/365,034, filed Mar. 31, 2019, assigned to the same assignee of this application, which is herein incorporated by reference. As such, any reference in the detailed description to a HDD or tape drive is merely for exemplification purposes and is not intended to limit the disclosure unless explicitly claimed. Furthermore, reference to or claims directed to magnetic recording devices are intended to include both HDD and tape drive unless HDD or tape drive devices are explicitly claimed.

Figure 1:
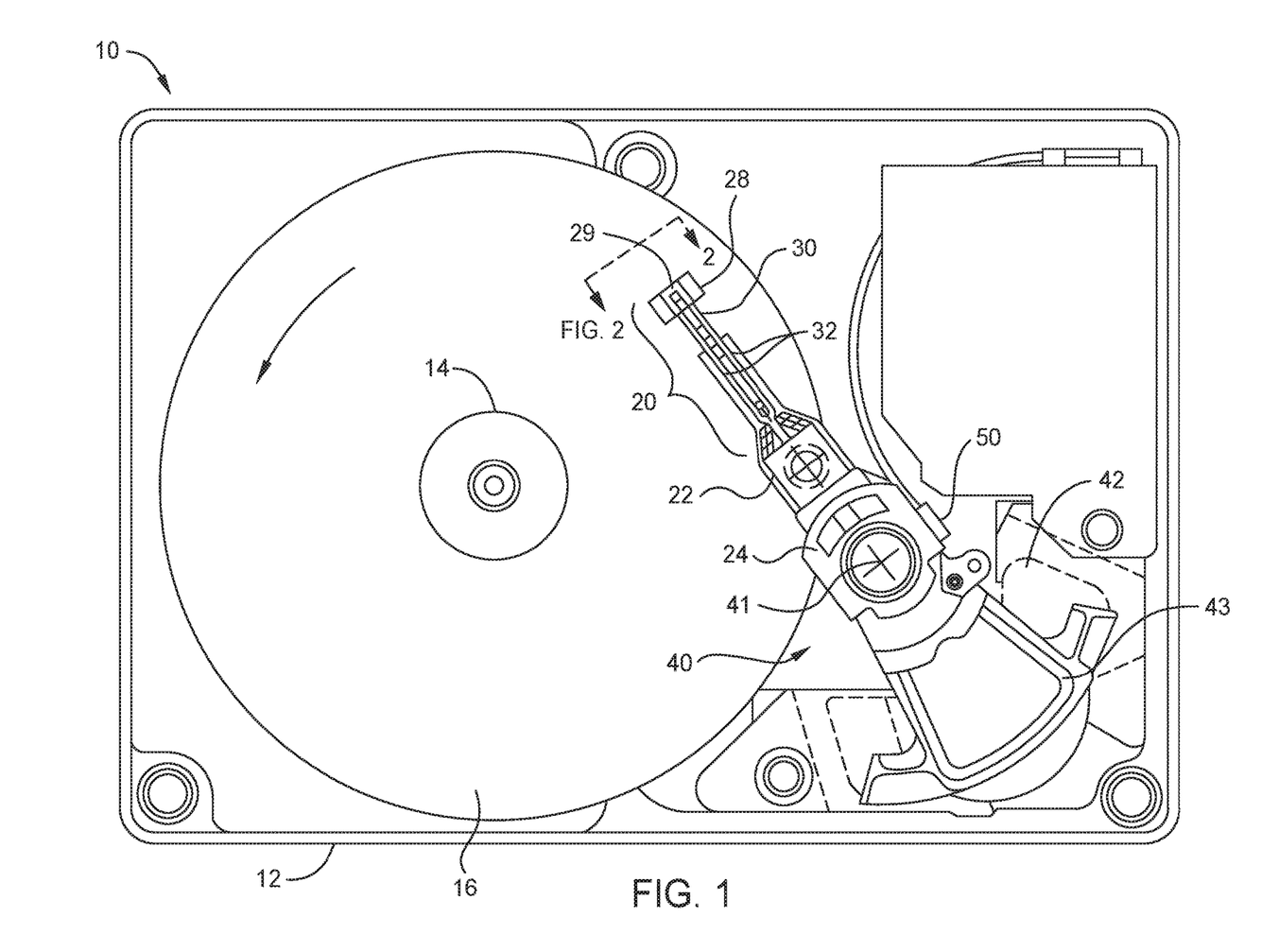
FIG. 1 is a partial schematic top plane view of a conventional head/disk assembly of a hard disk drive with the cover removed, according to one implementation.
Figure 2A:
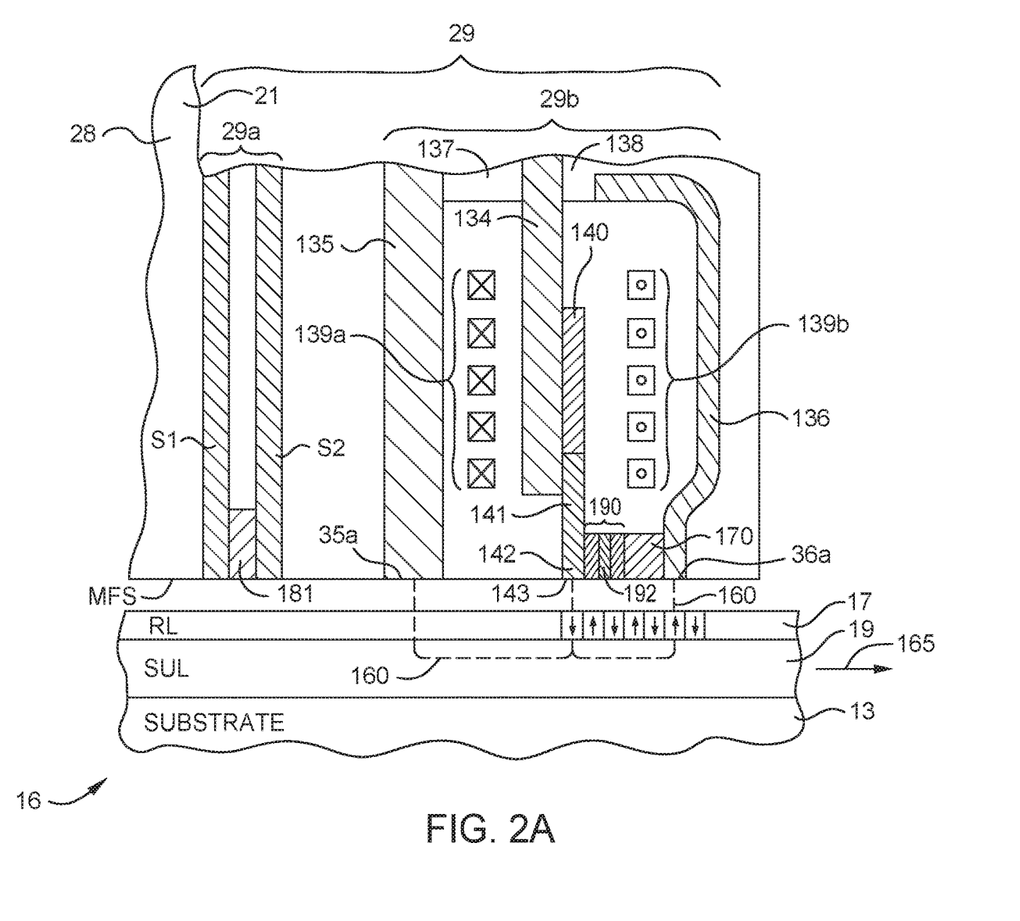
FIG. 2A is a partial schematic side sectional view of a perpendicular magnetic recording write head with an incorporated spin torque oscillator (STO), a read head and a recording disk taken through a central plane that intersects a data track on the disk, according to one implementation.

FIG. 1 is a partial schematic top plane view of a conventional head/disk assembly of a hard disk drive 10 with the cover removed, according to one implementation. The disk drive 10 includes a rigid base 12 supporting a spindle 14 that supports a stack of disks, including a disk 16 that is a top disk of the stack of disks. The spindle 14 is rotated by a spindle motor for rotating the disks in the direction shown by a curved arrow on the disk 16. The hard disk drive 10 has at least one load beam assembly 20 having an integrated lead suspension (ILS) or flexure 30 with a trace interconnect array 32 of electrically conductive interconnect traces or lines. The load beam assemblies 20 are attached to rigid arms 22 connected to an E-shaped support structure, sometimes called an E-block 24. Each flexure 30 is attached to a slider 28 that is an air-bearing slider. A magnetic recording read/write head 29 is located at the end or trailing surface 25 of slider 28. The write head 29 will incorporate a spin torque oscillator (STO) (one implementation is shown in FIG. 2A). The flexure 30 enables the slider 28 to "pitch" and "roll" on an air-bearing generated by the rotating disk 16. The hard disk drive 10 also includes a rotary actuator assembly 40 rotationally mounted to the rigid base 12 at a pivot point 41. The rotary actuator assembly 40 is a voice coil motor (VCM) actuator that includes a magnet assembly 42 fixed to the rigid base 12 and a voice coil 43. When energized by control circuitry, the voice coil 43 moves and thereby rotates E-block 24 with attached rigid arms 22 and load beam assemblies 20 to position the read/write heads 29 to the data tracks on the disks. The trace interconnect array 32 connects at one end to the read/write head 29 and at another other end to read/write circuitry contained in an electrical module or chip 50 secured to a side of the E-block 24. The chip 50 includes a read preamplifier and a write driver circuit.

FIG. 2A is a partial schematic side sectional view of a perpendicular magnetic recording write head with an incorporated spin torque oscillator (STO) 190, a read head and a recording disk taken through a central plane that intersects a data track on the disk 16, according to one implementation. As shown in FIG. 2A, the disk 16 is a dual-layer disk and the disk 16 includes a perpendicular magnetic data recording layer (RL) 17 on a "soft" or relatively low-coercivity magnetically permeable underlayer (SUL) 19 formed on a disk substrate 13 of the disk 16. The read/write head 29 is formed on slider 28 and includes a read head 29a and a write head 29b. The read head 29a includes a sensor 181, such as a magnetoresistive (MR) read element, located between two magnetic shields S1, S2. The write head 29b is a single write pole type of perpendicular magnetic recording (PMR) write head. The write head 29b includes a yoke structure with a main pole 134, a write pole 140, a first flux return pole 135, a second flux return pole 136, and a trailing shield 170. The write head 29b also includes the STO 190 between the write pole 140 and the trailing shield 170, and yoke studs 137, 138 connecting the main pole and the first and second flux return poles 135, 136 respectively. The write head 29b also includes a thin film coil that is part of a write coil around main pole 134. The write coil is shown in section including write coil sections 139a, 139b around the main pole 134. The write coil including write coil sections 139a, 139b is a helical coil wrapped around main pole 134. The write coil may also be a dual "pancake" coil in which all the coil sections are in substantially the same plane and wrapped around the yoke. A flared write pole (WP) 140 is part of the main pole 134 and has a flared portion 141 and a write pole tip (WP tip) 142 with an end 143 that faces an outer surface of the disk 16. Write current flowing through the through write coil sections 139a, 139b of the write coil induces a magnetic field (shown by dashed line 160) from the WP 140. The magnetic field 160 passes through the RL 17 (to magnetize a region of the RL 17 beneath the WP 140), through the flux return path provided by the SUL 19, and back to respective ends 35a, 36a of the first and second flux return poles 135, 136, respectively.

The read/write head 29 is formed as a series of thin films deposited on a trailing surface 21 of the slider 28 that has a media facing surface (MFS), such as an air bearing surface (ABS), supported above the outer surface of the disk 16. The read head 29a includes the sensor 181 located between the two magnetic shields S1 and S2 and is deposited on a trailing end of the slider 28 prior to the deposition of the layers being part of the write head 29b. In FIG. 2A, the disk 16 moves past the write head 29b in a direction indicated by arrow 165, and the portion of slider 28 that supports the read head 29a and the write head 29b is often called the trailing end of the slider 28, and the surface 21 perpendicular to the MFS of the slider 28 on which the write head 29b is located is often called the trailing surface of the slider 28.

The RL 17 is illustrated with perpendicularly recorded or magnetized regions, with adjacent regions having opposite magnetization directions, as represented by the arrows. The magnetic transitions between adjacent and oppositely-directed magnetized regions are detectable by the sensor 181 as the recorded bits.

FIG. 2A also illustrates the trailing shield (TS) 170 spaced from WP 140. The TS 170 is formed of a ferromagnetic material. The STO 190 is located between the WP 140 and the TS 170. The STO 190 includes a free layer 192 that is ferromagnetic, whose magnetization processes in the presence of current from electrical circuitry electrically connected to the WP 140 and the TS 170.

Figure 2B:
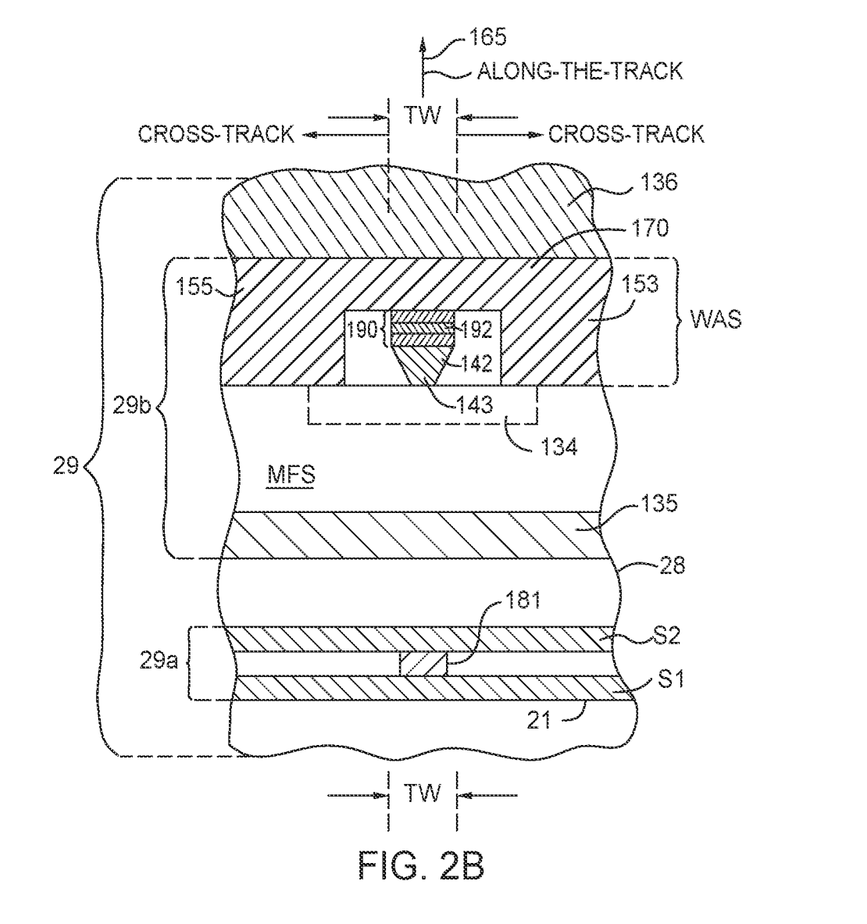
FIG. 2B illustrates a partial schematic cross-sectional view of the read/write head illustrated in Figure and as seen from the disk, according to one implementation.

FIG. 2B illustrates a partial schematic cross-sectional view of the read/write head 29 illustrated in FIG. 2A and as seen from the disk 16, according to one implementation. The MFS, such as the ABS, is the recording-layer-facing surface of the slider 28 that faces the outer surfaces of the disk 16 (as shown in FIG. 2A) and is shown without the thin protective overcoat that can be present in a slider. The recording-layer-facing surface means the surface of the slider 28 that is covered with a thin protective overcoat (if the thin protective overcoat is present), the actual outer surface of the slider if there is no thin protective overcoat present), or the outer surface of the thin protective overcoat. The phrase "substantially at the recording-layer-facing surface" means actually at the surface or slightly recessed from the surface. The disk 16 (as shown in FIG. 2A) moves relative to the read/write head 29 in the direction 165, which is called the along-the-track direction. A direction perpendicular to direction 165 and parallel to the plane of the MFS is called the cross-track direction. A width of the end 143 of the WP tip 142 in the cross-track direction substantially defines the track-width (TW) of the data tracks in the RL 17 (shown in FIG. 2A). The main pole 134 is shown with dashed lines because it is recessed from the MFS (see FIG. 2A).

The portions identified as 153, 155 on opposite ends of TS 170 are side shields which, together with TS 170, form a wraparound shield (WAS) that generally surrounds the WP tip 142. The WAS includes side shields 153, 155 and TS 170. The side shields 153, 155 and the TS 170 each have an end substantially at the recording-layer-facing surface (e.g., at the MFS). In one example, the side shields 153, 155 and the TS 170 are formed as a single-piece structure to form the WAS that substantially surrounds the WP tip 142 and are thus formed of the same material. The material of the side shields 153, 155 and the TS 170 includes an NiFe, CoFe or NiFeCo alloy, so that they have the same alloy composition. The side shields 153, 155 are separated from WP tip 142 by a nonmagnetic gap material. The STO 190 with the free layer 192 is located between the WP tip 142 and the TS 170. The WAS alters an angle of the write field of the write head 29b and improves the write field gradient at the point of writing, and also shields the writing field at regions of the RL away from the track being written. The WAS is shown as connected to the second flux return pole 136. However, the WAS may be a "floating" WAS not connected to either the second flux return pole 136 or other portions of the yoke by flux-conducting material. Also, instead of a WAS, the write head 29b may have separate side shields not connected to the TS 170.

In one embodiment, which can be combined with other embodiments, the STO 190 is a spin torque oscillator (STO) where one of the electrodes connected to the STO is formed of a magnetic material, and a nonmagnetic seed layer is located between the ferromagnetic electrode and the free layer. The other electrode may be formed of a magnetic material or a nonmagnetic material.

Figure 3:
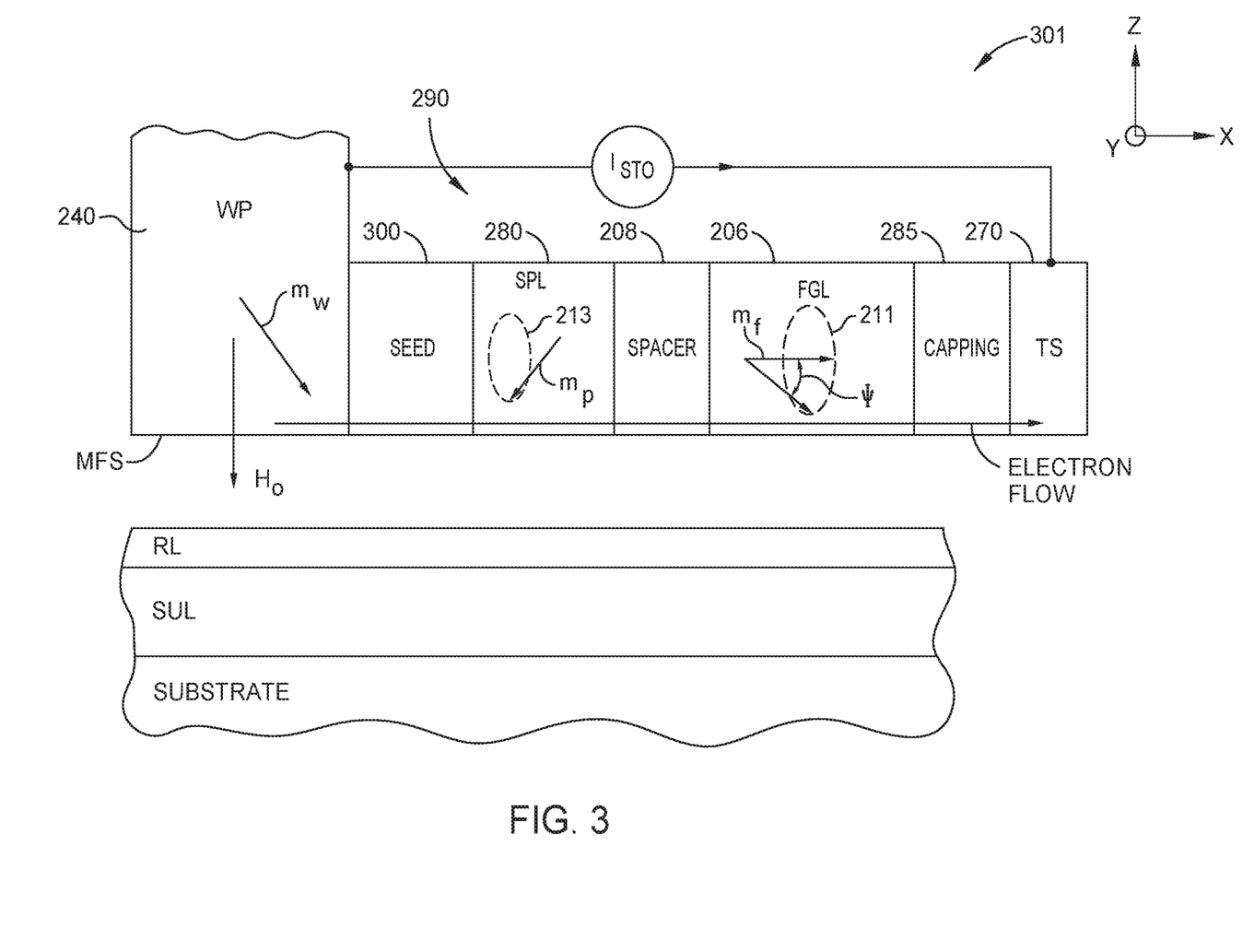
FIG. 3 is a partial schematic side view of a write head with an STO incorporated into the write head, according to one implementation.

FIG. 3 is a partial schematic side view of a write head 301 with an STO 290 incorporated into the write head 301, according to one implementation. The write head 301 is a PMR write head. A WP 240 functions as a first electrode and is formed of a ferromagnetic material. The TS 270 functions as the second electrode, and is also formed of a ferromagnetic material. The electrical circuitry of the STO 290 is connected between both electrodes and during writing provides current $I_{STO}$ between the WP 240 and the TS 270. The WP 240 has a magnetization ($m_w$) and thus generates spin-polarized electrons when write current is applied to the write coil. The electron flow is in the opposite direction from the WP 240 to the TS 270.

A spin polarizing layer (SPL) 280 of the STO 290 is formed on a seed layer 300. The SPL 280 may be referred to as a polarizer layer. The SPL 280 may be formed of a ferromagnetic material such as CoFe, NiFe, CoFeNi, CoMnGe, NiCo, NiFeCu, CoFeMnGe, CoMnSi, CoFeSi, other soft or hard ferromagnetic materials, or other Heusler alloys. The SPL 280 may also be formed of other magnetic materials, or multiple layers thereof. The SPL 280 acts as the polarizer (e.g. the supplier of spin-polarized electrons) for the STO 290 and has a magnetization ($m_P$). A field generating layer (FGL) 206 is formed on a spacer layer 208. The FGL 206 is between the SPL 280 and a cap layer 285. The FGL 206 includes a ferromagnetic material, and may be referred to as a free layer. The FGL 206 of the STO 290 has an edge substantially at the MFS and has a magnetization ($m_f$) that is free to rotate. The spacer layer 208 is nonmagnetic and is located between the SPL 280 and the FGL 206. The spacer layer 208 may be formed of Cu, but may also be formed of other materials like Au or Ag.

The seed layer 300 is formed between the SPL 280 and the WP 240. The seed layer 300 is nonmagnetic and is electrically-conducting. The seed layer 300 may be multilayered. The stack of layers making up the STO 290 are formed on a body of a slider after the WP 240 is formed, using deposition and lithographic techniques well-known in the fabrication of thin film read/write heads.

In operation of the STO 290, the magnetization $m_p$ of the SPL 280 is initially pointing in an initial direction from the WP 240 and toward the TS 270 prior to application of current to the STO 290, and can be parallel to the X-Y plane. The magnetization $m_f$ of the FGL 206 also points in an initial direction from the WP 240 and toward the TS 270. Current ($I_{STO}$) with a current density J is applied across the WP 240 and the TS 270. Application of the current $I_{STO}$ alters the directional orientation of the magnetization $m_p$, as discussed below.

In the implementation shown in FIG. 3, the current $I_{STO}$ flows from the TS 270, through the FGL 206, through the SPL 280, and to the WP 240. The flow of electrons is opposite of the flow of the current $I_{STO}$, as shown in FIG. 3. The flow of electrons is from the WP 240 through the seed layer 300, through the SPL 280 and the spacer layer 208, and to the FGL 206 where the polarized spin down electrons are reflected. The reflected spin-polarized electrons flow back through the spacer layer 208 and to the SPL 280, and the reflected spin-polarized electrons apply a spin torque on the magnetization $m_p$ of the SPL 280 to reverse the direction of the magnetization $m_p$ of the SPL 280. Upon the current density J reaching a critical value $J_c$, the directional orientation of the magnetization $m_p$ of the SPL 280 reverses and points in a reversed direction opposite of the initial direction discussed above. Upon reversal of the magnetization $m_p$, the reversed direction of the magnetization $m_p$ of the SPL 280 points in a direction from the TS 270 and toward the WP 240. Upon the current density J being above a critical value $J_c$, the magnetization $m_p$ of the SPL 280 remains pointed in the reversed direction and oscillates in a precessional motion and at a frequency in a vertical plane (e.g., the Y-Z plane). The rotation of the magnetization $m_p$ of the SPL 280 about the X-axis at an approximately fixed angle is depicted by the oval 213 that represents a circular precessional motion of the tip of the magnetization vector $m_p$ lying in a plane parallel to the Y-Z plane.

The directional orientation of the magnetization $m_f$ of the FGL 206 does not reverse upon the current density J reaching or being above the critical value $J_c$, and remains pointed in the initial direction described above for the magnetization $m_f$ of the FGL 206. Upon the current density J being above the critical value $J_c$, direct torque applied from the SPL 280 to the FGL 206 induces a precessional motion for the magnetization $m_f$ of the FGL 206 in the same horizontal direction but with an angle ψ relative to the initial direction of the magnetization $m_f$. The magnetization $m_f$ of the FGL 206 makes the angle LP in the Y-Z plane and has a component in the Y-Z plane that rotates at an azimuthal angle about the X-axis with a certain frequency f. The rotation of the magnetization $m_f$ of the FGL 206 about the X-axis at this approximately fixed angle LP is depicted by the oval 211 that represents a circular precessional motion of the tip of the magnetization vector $m_f$ lying in a plane parallel to the Y-Z plane. The frequency of precession depends on the properties and thicknesses of the materials making up the STO 290, but for a specific STO the frequency of precession is a function of the values of both $I_{STO}$ and $H_0$.

The implementation shown in FIG. 3 illustrates the electron flow flowing through the STO 290 from the WP 240 and to the TS 270. The present disclosure also contemplates implementations where the electron flow through the STO 290 is from the TS 270 and to the WP 240, such as in a T-mode configuration. In the T-mode configuration the SPL 280 and the FGL 206 are in the respective positions shown in FIG. 3, the current $I_{STO}$ flows through the STO 290 from the WP 240 and to the TS 270 such that the flow of current $I_{STO}$ is opposite of electron flow. In such an implementation, an initial direction of the magnetization $m_p$ of the SPL 280 prior to application of current is the same as the initial direction described for the implementation shown in FIG. 3. The directional orientation of the magnetization $m_p$ of the SPL 280 in the T-mode configuration would not reverse during operation and would remain in the initial direction upon the current density J reaching or being above the critical value $J_c$. In the T-mode configuration, the magnetization $m_p$ also will not oscillate in a precessional motion upon the current density J reaching or being above the critical value $J_c$. In the T-mode configuration, the magnetization $m_f$ of the FGL 206 is in the same initial direction as described for FIG. 3, and does not reverse. In the T-mode configuration, the magnetization $m_f$ of the FGL 206 begins to oscillate in a precessional motion upon the current density J reaching the critical value $J_c$, and oscillates in a fashion similar to the precessional motion described for FIG. 3 upon the current density J being above the critical value $J_c$.

During writing, the WP 240 (which is part of a main pole) applies a write field $H_0$ to the magnetic grains in the recording layer (RL) at the same time the precession of the magnetization $m_f$ of the FGL 206 from the STO 290 applies an auxiliary ac field at frequency f to the magnetic grains. This results in microwave-assisted magnetic recording (MAMR), which improves the switching of the magnetization of the grains in the RL, with the improvement depending on the frequency f at which the auxiliary field is applied. Indeed, ferromagnetic materials absorb energy from AC magnetic fields more efficiently at or near a ferromagnetic resonance frequency of the ferromagnetic materials, as described in Kittel C., "On the Theory of Ferromagnetic Resonance Absorption", Phys. Rev. 73, pp. 155-161 (1948). Accordingly, the frequency f of the auxiliary magnetic field from the FGL 206 of the STO 290 is designed to be preferably within a range near the ferromagnetic resonance of the magnetic material making up the grains in the RL.

Hence, the write field used from the PMR write head can be reduced from what would be required to switch the magnetization of the grains in the RL without MAMR. MAMR may also be used to increase the coercivity of the RL above that which could be written to by a PMR write head alone. However, even if the frequency f of the auxiliary magnetic field from the FGL 206 is not near the resonance of the magnetic material in the grains of the RL, so that there is no microwave assistance, the magnetization $m_f$ of the FGL 206 and/or the magnetization $m_p$ of the SPL 280 will still provide an assist field component that will assist the write field $H_0$, such as an AC field or a DC field.

When write current from the coil is switched, the write field is switched from the direction into the RL (as depicted in FIG. 3) to out of the RL, which results in a switching of directions of the magnetizations $m_w$, $m_p$ and $m_f$, as well as the direction of the assist field component.

The spacer layer 208 is formed over the SPL 280. The FGL 206 is formed over the spacer layer 208. The cap layer 285 is between the FGL 206 and the TS 270. The cap layer 285 is nonmagnetic, and may be formed of a layer or multilayer of metals or metal alloys, such as Ru, Ir, Ta, Ti, metals, and/or metal alloys. It is to be understood that the layer 285 (shown as a cap layer) may be a second spacer layer that is similar to the spacer layer 208, and may include one or more of the aspects, features, components, and/or properties thereof. In one example, the layer 285 is a second spacer layer in a notched configuration where the second spacer layer is stitched into a notch of the TS 270. The second spacer layer transfers torque. The layer 285 is an end layer of the STO 290.

Figure 4:
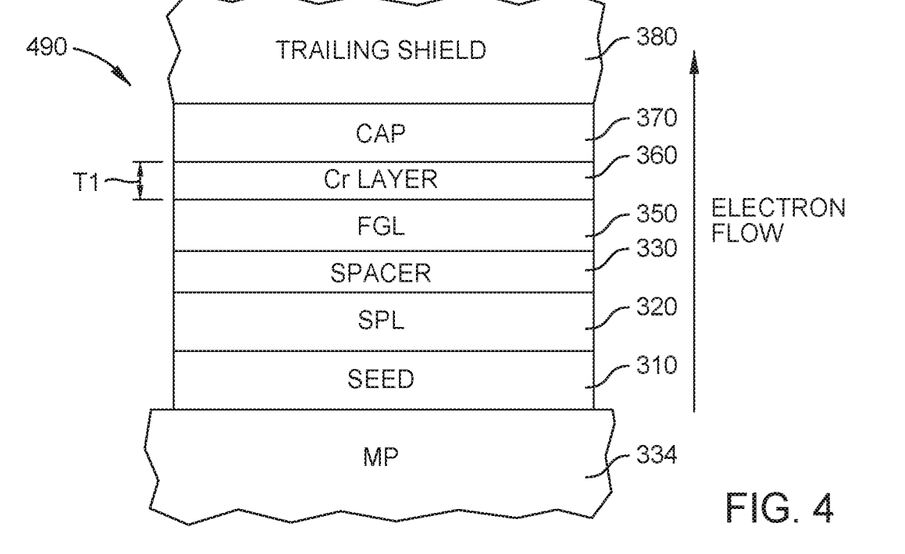
FIG. 4 is a partial schematic sectional view of an STO between a main pole (MP) and a trailing shield, according to one implementation.

FIG. 4 is a partial schematic sectional view of an STO 490 between a main pole (MP) 334 and a trailing shield 380, according to one implementation. The STO 490 may be used in place of, or in combination with one or more aspects of, the STO 290 illustrated in FIG. 3. The STO 490 is coupled to the main pole 334 and the trailing shield 380. As discussed above, the main poles described herein (such as the MP 334) may include a portion that is a write pole, and the write pole may include a flared portion. Hence, the present disclosure contemplates that the STO 490 may be coupled to the portion of the main pole 334 that is the write pole. For example, the STO 490 may be coupled to the flared portion of the write pole of the main pole 334.

Electrons flow through the STO 490 from the MP 334 and to the trailing shield 380, as described in relation to FIG. 3. The STO 490 includes a seed layer 310 formed on the main pole 334, and a cap layer 370 on and below the trailing shield 380. The STO 490 also includes a spin polarizing layer (SPL) 320 on the seed layer 310 and between the seed layer 310 and the cap layer 370. The STO 490 also includes a field generating layer (FGL) 350 between the SPL 320 and the cap layer 370, and spacer layer 330 between the SPL 320 and the FGL 350.

The cap layer 370 is a ruthenium (Ru) layer in one embodiment. The cap layer 370 may be one or more metal or metal alloy films selected from one or more films of one or more of Cu, Cr, Ta, Ru, Hf, Nb, NiAl, and alloys thereof. Spin-polarized electrons polarized using the SPL 320 drive a magnetization of the FGL 350 to rotate along a gap field. The FGL 350 generates high frequency magnetic fields through oscillation. The FGL 350 includes iron (Fe) and cobalt (Co). In one embodiment, which can be combined with other embodiments, the FGL 350 is an iron/cobalt (Fe/Co) bilayer. In one embodiment, which can be combined with other embodiments, the FGL 350 is a cobalt/iridium (Co/Ir) bilayer, a manganese-antimony (MnSb) bilayer, or an iron-carbon (FeC) bilayer. The spacer layer 330 is a copper (Cu) layer; however, other like compounds may be appropriate for use in the spacer layer 330. The seed layer 310 is a ruthenium (Ru) layer in one embodiment.

The SPL 320 includes a ferromagnetic material, and may include a ferromagnetic material such as one or more of NiFe, CoFe, Fe, Co, CoFeAl, CoFeGe, CoMnGe, CoFeSi, CoMnSi, alloys thereof, and/or other magnetic materials alloys, ferromagnetic Heusler alloys, and/or multiple layers thereof. Full and half Heusler alloys are intermetallics with particular composition and crystal structure. Examples of Heusler alloys include but are not limited to the full Heusler alloys $Co_2MnX$ (where X is one or more of Al, Sb, Si, Sn, Ga, or Ge) and $Co_2FeZ$ (where Z is one or more of Ge, Si, Al, Sn or Ga). Examples also include but are not limited to the half Heusler alloys NiMnSb, and PtMnSb. A perfect Heusler alloy will have 100% spin-polarization. However, it is possible that in a thin-film form and at finite temperatures, the band structure of the Heusler alloy may deviate from its ideal half metal structure and that the spin polarization will decrease. For example, some alloys may exhibit chemical site disorder and crystallize in the B2 structure instead of the L21 Heusler structure. Nevertheless, the spin polarization may exceed that of conventional ferromagnetic alloys. Thus, as used herein a "Heusler alloy" shall mean an alloy with a composition substantially the same as that of a known Heusler alloy, and which results in enhanced spin polarization compared to conventional ferromagnetic materials such as NiFe and CoFe alloys.

The STO 490 also includes one or more insertion layers, which may be referred to as chromium (Cr) layers, between the seed layer 310 and the cap layer 370. The one or more chromium layers may be referred to as one or more chromium insertion layers. In the implementation shown in FIG. 4, the one or more chromium layers include a first chromium layer 360 inserted on the FGL 350 and between the FGL 350 and the cap layer 370. The cap layer 370 is formed on the first chromium layer 360. The first chromium layer 360 includes a thickness T1 that is up to 40 Angstroms (Å), such as within a range of 1 Angstrom to 40 Angstroms. In one embodiment, which can be combined with other embodiments, the thickness T1 is within a range of 15 Angstroms to 25 Angstroms, such as within a range of 18 Angstroms to 22 Angstroms or about 20 Angstroms.

Figure 5:
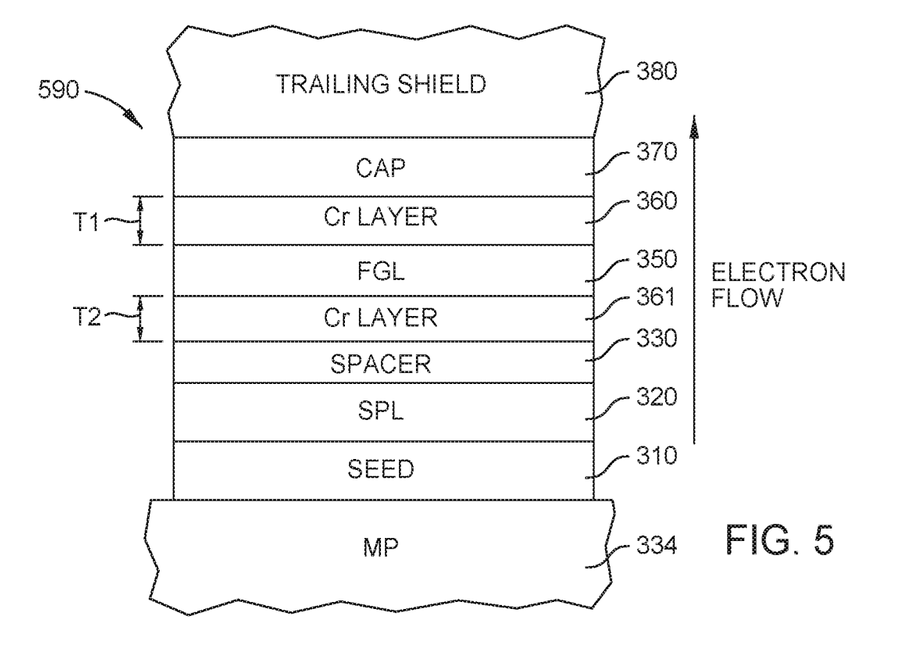
FIG. 5 is a partial schematic sectional view of an STO between the main pole (MP) and the trailing shield illustrated in FIG. 4, according to one implementation.

FIG. 5 is a partial schematic sectional view of an STO 590 between the main pole (MP) 334 and the trailing shield 380 illustrated in FIG. 4, according to one implementation. The STO 590 may be used in place of, or in combination with one or more aspects of, the STO 290 illustrated in FIG. 3. Electrons flow through the STO 590 from the main pole 334 to the trailing shield 380, as described in FIG. 3. The STO 590 is similar to the STO 490 illustrated in FIG. 4, and includes one or more of the aspects, features, components, and/or properties thereof.

The one or more chromium layers of the STO 590 include a first chromium layer 360. The one or more chromium layers also include a second chromium layer 361 disposed on the spacer layer 330 and being between the spacer layer 330 and the FGL 350. The second chromium layer 361 includes a thickness T2 that is up to 20 Angstroms, such as within a range of 1 Angstrom to 20 Angstroms. In one embodiment, which can be combined with other embodiments, the thickness T1 of the first chromium layer 360 is larger than the thickness T2 of the second chromium layer 361. In one embodiment, which can be combined with other embodiments, the thickness T2 of the second chromium layer 361 is within a range of 5 Angstroms to 15 Angstroms, such as within a range of 8 Angstroms to 12 Angstroms, such as about 10 Angstroms.

Figure 6A:
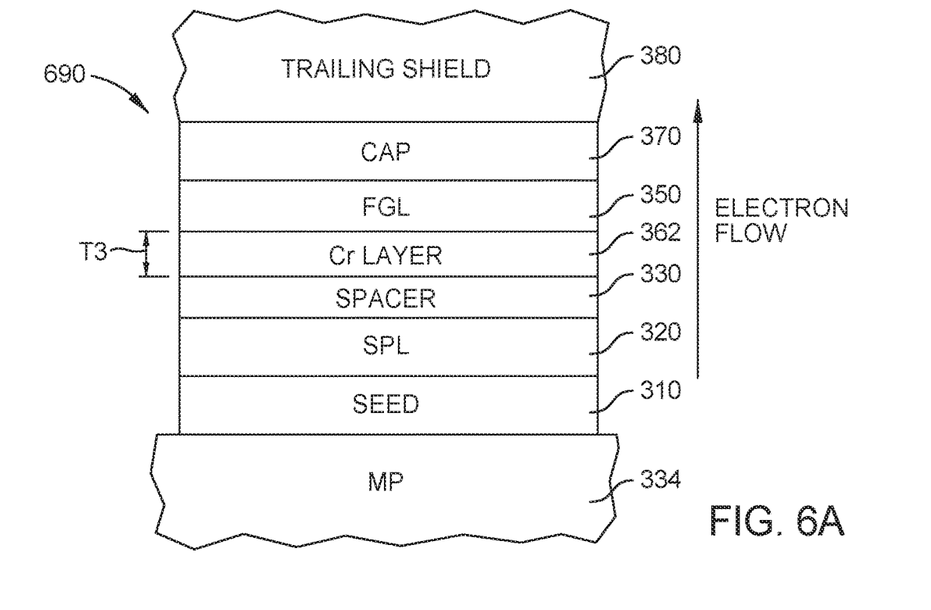
FIG. 6A is a partial schematic sectional view of an STO between the main pole (MP) and the trailing shield illustrated in FIGS. 4 and 5, according to one implementation.

FIG. 6A is a partial schematic sectional view of an STO 690 between the main pole (MP) 334 and the trailing shield 380 illustrated in FIGS. 4 and 5, according to one implementation. The STO 690 may be used in place of, or in combination with one or more aspects of, the STO 290 illustrated in FIG. 3. Electrons flow through the STO 690 from the main pole 334 to the trailing shield 380, as described in FIG. 3. The STO 690 is similar to the STO 490 illustrated in FIG. 4 and the STO 590 illustrated in FIG. 5, and may include one or more of the aspects, features, components, and/or properties thereof.

The one or more chromium layers of the STO 690 include a chromium layer 362 disposed on the spacer layer 330 and between the spacer layer 330 and the FGL 350. The chromium layer 362 is in contact with the spacer layer 330 and the FGL 350. The chromium layer 362 includes a thickness T3 that is up to 20 Angstroms, such as within a range of 1 Angstrom to 20 Angstroms. In one embodiment, which can be combined with other embodiments, the thickness T3 is within a range of 2 Angstroms to 8 Angstroms, such as about 5 Angstroms.

Figure 6B:
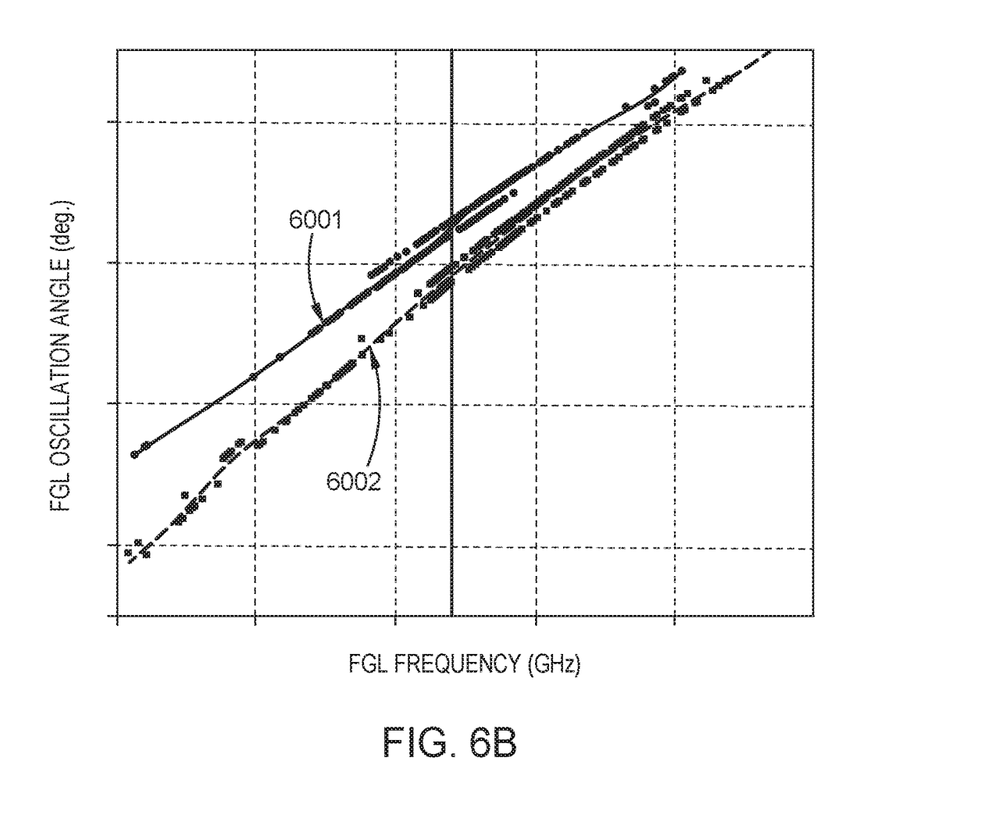
FIG. 6B is a graph of an FGL oscillation angle and an FGL frequency, according to one implementation.

FIG. 6B is a graph of an FGL oscillation angle and an FGL frequency, according to one implementation. The FGL oscillation angle is shown on the y-axis and the FGL frequency is shown on the x-axis. For an MAMR gain at large frequencies such as an FGL frequency of about 20-25 GHz, a large FGL oscillation angle is used to facilitate efficient and effective magnetic recording operations. The FGL frequency is a function of the FGL oscillation angle so it can be difficult to increase the FGL oscillation angle. The Kittle Formula, shown below, is a mathematical description of the FGL oscillation angle, where $H_{ext}$, $H_d$, and $H_k$ can be modified by utilizing different materials and/or configurations of the materials.

$$\theta = \cos^{-1}\left(\frac{H_{ext} - 2\pi f/\gamma}{H_d - H_k}\right) \quad \text{(Kittle Formula)}$$

In order to increase the FGL oscillation angle (θ), the denominator of the Kittle Formula needs to be large and can be modified with the type of materials used in the construction of the STO. In implementations described herein, $H_k$ is improved (i.e., becomes more negative) to increase the FGL oscillation angle at high FGL frequencies. Including the one or more chromium layers (such the chromium layers 360-362 of FIGS. 4, 5, and 6a) facilitates improving the interface $H_k$, which facilitates increasing the FGL oscillation angle at large FGL frequencies.

FIG. 6B illustrates the improvement in the FGL oscillation angle across FGL frequencies (such as large frequencies of 20-25 GHz) when the chromium layer 362 is included in the STO 690 as illustrated in FIG. 6A. The addition of the chromium layer 362 results in a first angle profile 6001 that is larger than a second angle profile 6002 that is generated without the chromium layer 362. The increase of the FGL oscillation angle by adding the chromium layer 362 layer may be about 10 degrees at lower FGL frequencies (such as 10-15 GHz) to about 5 degrees at higher FGL frequencies (such as 20-30 GHz).

Figure 7:
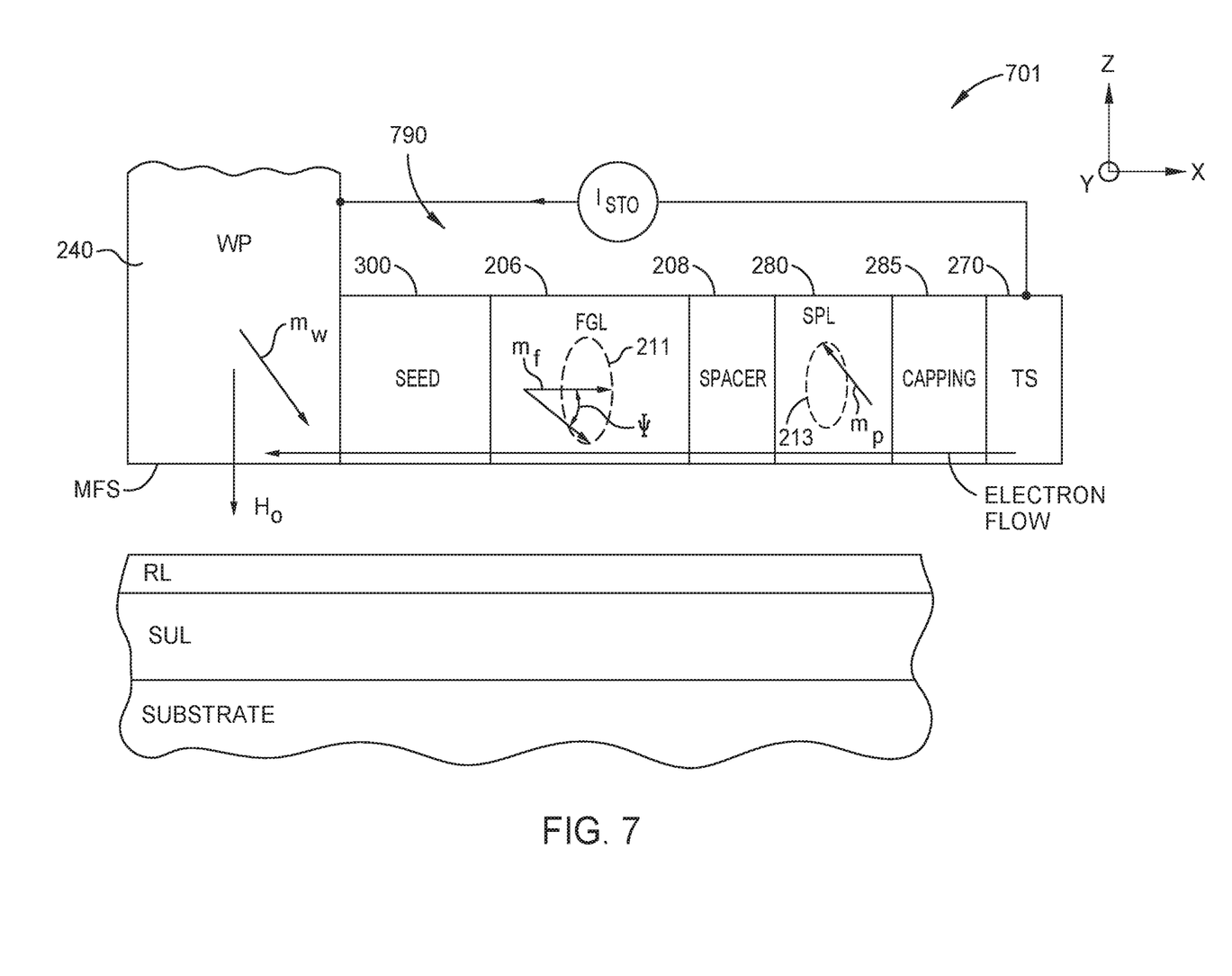
FIG. 7 is a partial schematic side view of a write head with an STO incorporated into the write head, according to one implementation.

FIG. 7 is a partial schematic side view of a write head 701 with an STO 790 incorporated into the write head 301, according to one implementation. The STO 790 and the write head 701 are similar to the STO 290 and the write head 301 illustrated in relation to FIG. 3, and includes one or more of the aspects, features, components, and/or properties thereof. The STO 790 is similar to the STO 290 of FIG. 3, and the positions of the FGL 206 and the SPL 280 are swapped as compared to the positions of the FGL 206 and the SPL 280 in FIG. 3. Hence, the SPL 280 is disposed on the spacer layer 208 and between the FGL 206 and the cap layer 285. The FGL 206 is formed on the seed layer 300 and is between the seed layer 300 and the spacer layer 208. The FGL 206 is in contact with the seed layer 300 and the spacer layer 208. The SPL 280 is formed on the spacer layer 208 and is between the spacer layer 208 and the cap layer 285. The SPL 280 is in contact with the spacer layer 208 and the cap layer 285. Electron flow in FIG. 7 is in an opposite direction relative to the electron flow shown in FIG. 3. In FIG. 7, electrons flow from the TS 270, through the STO 790, and to the WP 240. The directional orientation of the magnetization $m_p$ of the SPL 280 shown in FIG. 7 is after the magnetization $m_p$ is reversed using spin-polarized electrons that reflect off the FGL 206 and toward the SPL 280, and a precessional and oscillating motion is induced for the magnetization $m_p$.

Figure 8A:
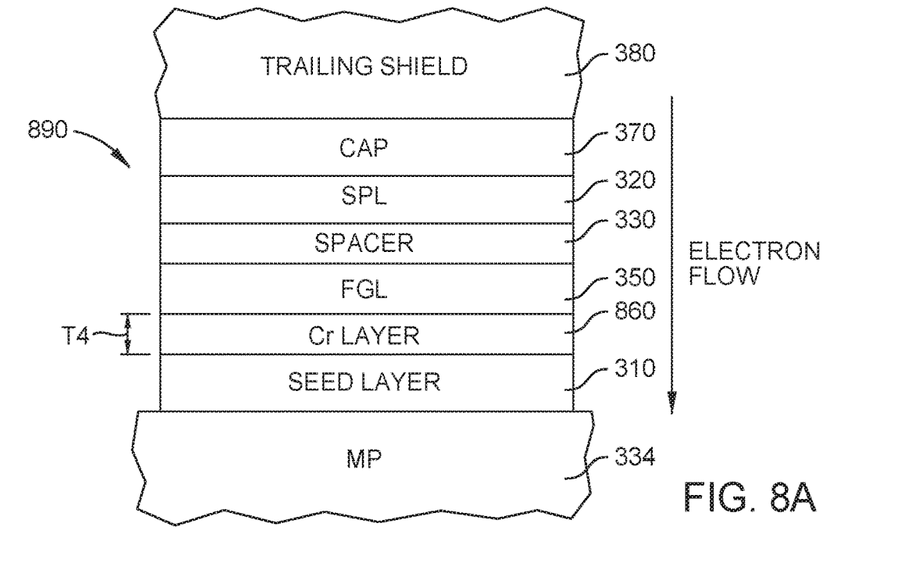
FIG. 8A is a partial schematic sectional view of an STO between the main pole (MP) and the trailing shield illustrated in FIG. 4, according to one implementation.

FIG. 8A is a partial schematic sectional view of an STO 890 between the main pole (MP) 334 and the trailing shield 380 illustrated in FIG. 4, according to one implementation. The STO 890 may be used in place of, or in combination with one or more aspects of, the STO 790 shown in FIG. 7. The STO 890 is similar to the respective STO 490, 590, and/or 690 illustrated in relation to FIGS. 4, 5, and 6A, and includes one or more of the aspects, features, components, and/or properties thereof.

The STO 890 includes one or more chromium layers between the seed layer 310 and the cap layer 370. The one or more chromium layers include a first chromium layer 860 formed on the seed layer 310 and disposed between the seed layer 310 and the FGL 350. The first chromium layer 860 is contact with the seed layer 310 and the FGL 350. The first chromium layer 860 includes a thickness T4 that is up to 80 Angstroms, such as within a range of 1 Angstrom to 80 Angstroms. In one embodiment, which can be combined with other embodiments, the thickness T4 is within a range of 15 Angstroms to 25 Angstroms, such as within a range of 18 Angstroms to 22 Angstroms, such as about 20 Angstroms.

Figure 8B:
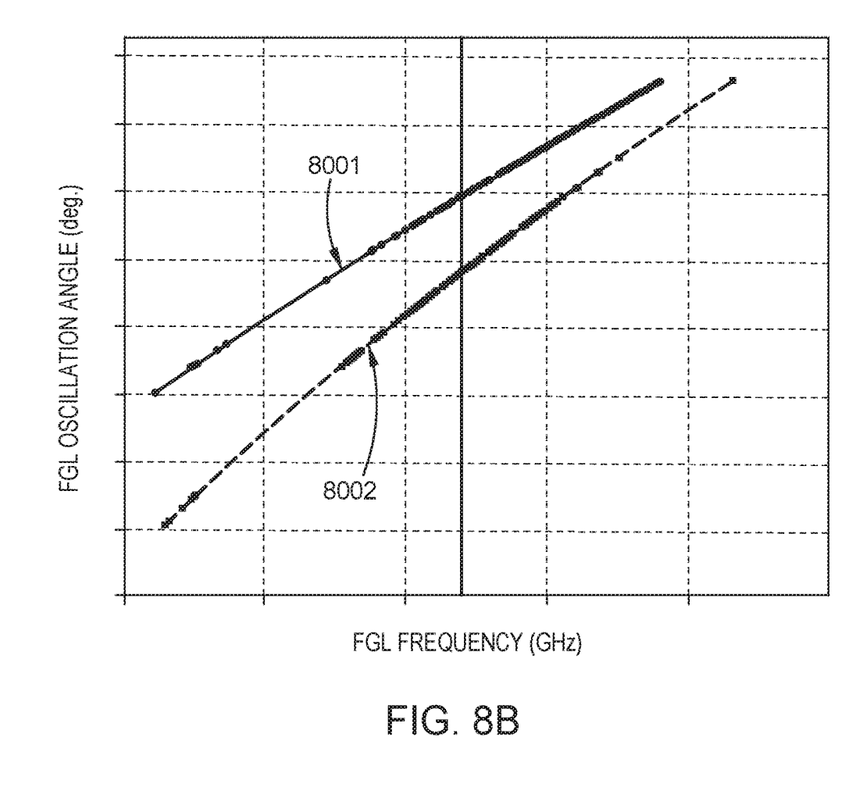
FIG. 8B is a graph of an FGL oscillation angle and an FGL frequency, according to one implementation.

FIG. 8B is a graph of an FGL oscillation angle and an FGL frequency, according to one implementation. The FGL oscillation angle is shown on the y-axis and the FGL frequency is shown on the x-axis. For an MAMR gain at large frequencies such as an FGL frequency of about 20-25 GHz, a large FGL oscillation angle is used to facilitate efficient and effective magnetic recording operations. Including the one or more chromium layers (such the first chromium layer 860 of FIG. 8A or the second chromium layer 861 of FIG. 9) facilitates improving the interface $H_k$ of the Kittle Formula, which facilitates increasing the FGL oscillation angle at large FGL frequencies.

FIG. 8B illustrates the improvement in the FGL oscillation angle across FGL frequencies (such as large frequencies of 20-25 GHz) when the first chromium layer 860 is included in the STO 890 as illustrated in FIG. 8A. The addition of the first chromium layer 860 results in a first angle profile 8001 that is larger than a second angle profile 8002 that is generated without the first chromium layer 860. The increase of the FGL oscillation angle by adding the first chromium layer 860 layer may be about 10 degrees at lower FGL frequencies (such as 10-15 GHz) to about 5 degrees at higher FGL frequencies (such as 20-30 GHz).

Figure 9:
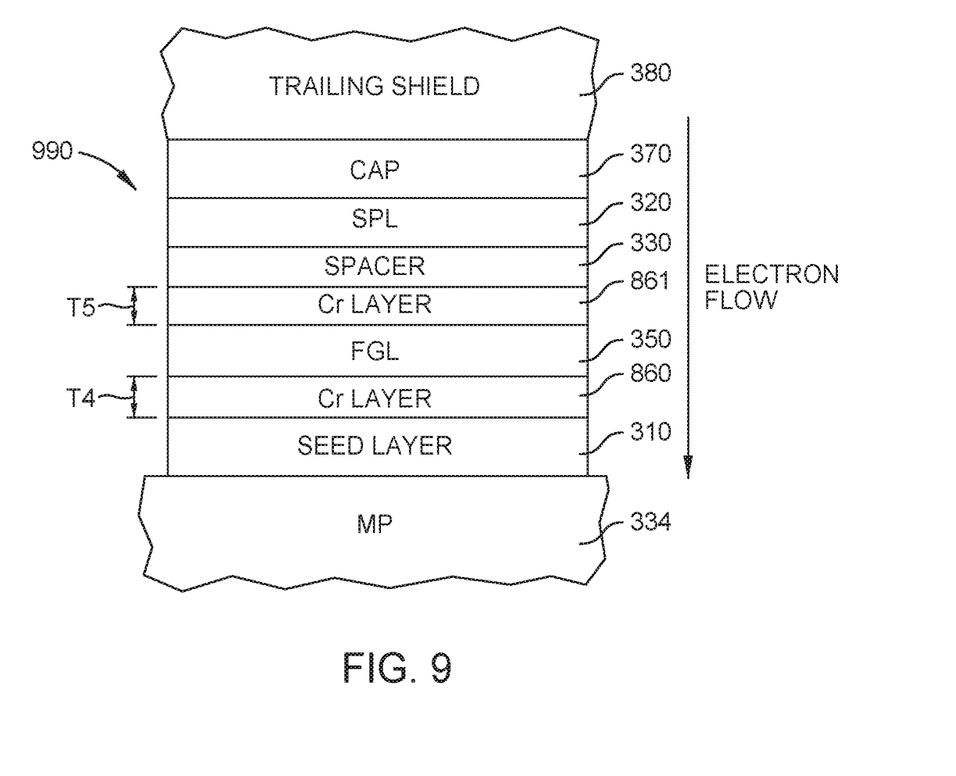
FIG. 9 is a partial schematic sectional view of an STO between the main pole (MP) and the trailing shield illustrated in FIG. 8A, according to one implementation.

FIG. 9 is a partial schematic sectional view of an STO 990 between the main pole (MP) 334 and the trailing shield 380 illustrated in FIG. 8A, according to one implementation. The STO 990 may be used in place of, or in combination with one or more aspects of, the STO 790 illustrated in FIG. 7. Electrons flow through the STO 990 from the trailing shield 380 to the main pole 334, as described in FIG. 7. The STO 990 is similar to the STO 890 illustrated in FIG. 8A, and includes one or more of the aspects, features, components, and/or properties thereof.

The one or more chromium layers of the STO 990 include a first chromium layer 860. The one or more chromium layers also include a second chromium layer 861 disposed on the FGL 350 and being between the FGL 350 and the spacer layer 330. The second chromium layer 861 includes a thickness T5 that is up to 20 Angstroms, such as within a range of 1 Angstrom to 20 Angstroms. In one embodiment, which can be combined with other embodiments, the thickness T4 of the first chromium layer 860 is larger than the thickness T5 of the second chromium layer 861. In one embodiment, which can be combined with other embodiments, the thickness T5 of the second chromium layer 861 is within a range of 5 Angstroms to 15 Angstroms, such as within a range of 8 Angstroms to 12 Angstroms, such as about 10 Angstroms.

The present disclosure contemplates that the write heads (such as write heads 29b, 301, and/or 701) and the STO's (such as the STO's 190, 290, 490, 590, 690, 790, 890, and/or 990) described herein may be at least part of magnetic media drives, such as magnetic hard disk drives.

Benefits of the present disclosure include improving the $H_k$ (e.g., increasing negatively) of the Kittle Formula to increase the FGL oscillation angles for high FGL frequencies. Increasing FGL oscillation angles in such a fashion incurs benefits such as simply facilitating effective and efficient magnetic recording, and high ADC of magnetic recording. By adding one or more chromium layers above and/or below the FGL, such as the Fe/Co layer, the oscillation angle is increased across various FGL frequencies with reduced or no alteration of the properties of other layers such as the FGL or the SPL. Including one or more chromium layers is simpler and more effective than altering other layers, such as the FGL, due to the effect $H_k$ has on the FGL oscillation angle.

It is contemplated that one or more aspects disclosed herein may be combined. Moreover, it is contemplated that one or more aspects disclosed herein may include some or all of the aforementioned benefits.

In one embodiment, a write head comprises a main pole, a trailing shield, and a spin torque oscillator (STO) coupled to the main pole and the trailing shield. The STO includes a seed layer on the main pole, a layer on the trailing shield, and a spin polarizing layer between the seed layer and the layer on the trailing shield. The STO also includes a field generating layer between the spin polarizing layer and the layer on the trailing shield, and a spacer layer between the spin polarizing layer and the field generating layer. The STO also includes one or more chromium layers between the seed layer and the layer on the trailing shield. The seed layer is a ruthenium layer, and the layer on the trailing shield is a ruthenium layer. The spacer layer is a copper layer, and the field generating layer includes iron and cobalt. The one or more chromium layers include a first chromium layer disposed on the field generating layer and between the field generating layer and the layer on the trailing shield. The first chromium layer is of a thickness that is up to 40 Angstroms. The one or more chromium layers further include a second chromium layer disposed on the spacer layer and between the spacer layer and the field generating layer. The second chromium layer is of a thickness that is up to 20 Angstroms. The one or more chromium layers include a chromium layer disposed on the spacer layer and between the spacer layer and the field generating layer. A magnetic media drive that includes the write head is also disclosed.

In another embodiment, a write head that comprises a main pole, a trailing shield, and a spin torque oscillator (STO) coupled to the main pole and the trailing shield. The STO includes a seed layer on the main pole, a layer on the trailing shield, and a field generating layer between the seed layer and the layer on the trailing shield. The STO also includes a spin polarizing layer between the field generating layer and the layer on the trailing shield, and a spacer layer between the field generating layer and the spin polarizing layer. The STO also includes one or more chromium layers between the seed layer and the layer on the trailing shield. The one or more chromium layers include a first chromium layer disposed on the seed layer and between the seed layer and the field generating layer. The first chromium layer is of a thickness that is up to 80 Angstroms. The one or more chromium layers further include a second chromium layer disposed on the field generating layer and between the field generating layer and the spacer layer. The second chromium layer is of a thickness that is about 10 Angstroms. A magnetic media drive that includes the write head is also disclosed.

In another embodiment, a spin torque oscillator comprises a seed layer, an end layer, a spin polarizing layer between the seed layer and the end layer, and a field generating layer between the seed layer and the end layer. The spin torque oscillator also includes a spacer layer between the spin polarizing layer and the field generating layer. The spin torque oscillator also includes one or more chromium layers disposed on one or more of the seed layer, the field generating layer, or the spacer layer. Each of the one or more chromium layers is of a thickness that is up to 80 Angstroms. The one or more chromium layers include a chromium layer disposed on the field generating layer, and the thickness of the chromium layer disposed on the field generating layer is within a range of 15 Angstroms to 25 Angstroms. The one or more chromium layers include a chromium layer disposed on the seed layer, and the thickness of the chromium layer disposed on the seed layer is within a range of 15 Angstroms to 25 Angstroms. The one or more chromium layers include a chromium layer disposed on the spacer layer, and the thickness of the chromium layer disposed on the spacer layer is within a range of 5 Angstroms to 15 Angstroms. A magnetic media drive that includes the spin torque oscillator is also disclosed.

While the foregoing is directed to embodiments of the present disclosure, other and further embodiments of the disclosure may be devised without departing from the basic scope thereof, and the scope thereof is determined by the claims that follow.

What is claimed is:

1. A write head, comprising:
   a main pole;
   a trailing shield; and
   a spin torque oscillator (STO) coupled to the main pole and the trailing shield, the STO comprising:
      a seed layer on the main pole;
      a layer on the trailing shield;
      a spin polarizing layer between the seed layer and the layer on the trailing shield;
      a field generating layer between the spin polarizing layer and the layer on the trailing shield;
      a nonmagnetic spacer layer between the spin polarizing layer and the field generating layer; and
      a chromium layer disposed on the nonmagnetic spacer layer and between the nonmagnetic spacer layer and the field generating layer.

2. The write head of claim 1, wherein the chromium layer is of a thickness that is up to 20 Angstroms.

3. A magnetic media drive comprising the write head of claim 1.

4. A spin torque oscillator, comprising:
   a seed layer;
   an end layer;
   a spin polarizing layer between the seed layer and the end layer;
   a field generating layer between the seed layer and the end layer;
   a nonmagnetic spacer layer between the spin polarizing layer and the field generating layer; and
   one or more chromium layers comprising a chromium layer disposed on the nonmagnetic spacer layer and between the nonmagnetic spacer layer and the field generating layer, and each of the one or more chromium layers is of a thickness that is up to 40 Angstroms.

5. The spin torque oscillator of claim 4, wherein a thickness of the chromium layer disposed on the nonmagnetic spacer layer is within a range of 2 Angstroms to 8 Angstroms.

6. The spin torque oscillator of claim 4, wherein a thickness of the chromium layer disposed on the nonmagnetic spacer layer is within a range of 5 Angstroms to 15 Angstroms.

7. A magnetic media drive comprising the spin torque oscillator of claim 4.

8. The spin torque oscillator of claim 4, wherein the one or more chromium layers further comprise a chromium layer disposed on the field generating layer and between the field generating layer and the end layer.

9. The spin torque oscillator of claim 8, wherein the chromium layer disposed on the field generating layer and between the field generating layer and the end layer is of a thickness that is within a range of 15 Angstroms to 25 Angstroms.

10. A write head, comprising:
a main pole;
a trailing shield; and
a spin torque oscillator (STO) coupled to the main pole and the trailing shield, the STO comprising:
 a seed layer on the main pole;
 a layer on the trailing shield;
 a field generating layer between the seed layer and the layer on the trailing shield;
 a spin polarizing layer between the field generating layer and the layer on the trailing shield;
 a nonmagnetic spacer layer between the field generating layer and the spin polarizing layer; and
 a chromium layer disposed on the field generating layer and between the field generating layer and the nonmagnetic spacer layer.

11. The write head of claim 10, further comprising a chromium layer disposed on the seed layer and between the seed layer and the field generating layer.

12. The write head of claim 11, wherein the chromium layer disposed on the seed layer is of a thickness that is up to 80 Angstroms.

13. The write head of claim 11, wherein the chromium layer disposed on the seed layer is of a thickness that is within a range of 15 Angstroms to 25 Angstroms.

14. The write head of claim 10, wherein the chromium layer disposed on the field generating layer is of a thickness that is about 10 Angstroms.

15. A magnetic media drive comprising the write head of claim 10.

16. A write head, comprising:
a main pole;
a trailing shield; and
a spin torque oscillator (STO) coupled to the main pole and the trailing shield, the STO comprising:
 a seed layer on the main pole;
 a layer on the trailing shield;
 a spin polarizing layer between the seed layer and the layer on the trailing shield;
 a field generating layer between the spin polarizing layer and the layer on the trailing shield;
 a spacer layer between the spin polarizing layer and the field generating layer; and
 one or more chromium layers between the seed layer and the layer on the trailing shield, the one or more chromium layers comprising:
  a first chromium layer disposed on the field generating layer and between the field generating layer and the layer on the trailing shield, and
  a second chromium layer disposed on the spacer layer and between the spacer layer and the field generating layer.

17. The write head of claim 16, wherein the seed layer is a ruthenium layer, and the layer on the trailing shield is a ruthenium layer.

18. The write head of claim 17, wherein the spacer layer is a copper layer, and the field generating layer comprises iron and cobalt.

19. The write head of claim 16, wherein the first chromium layer is of a thickness that is up to 40 Angstroms.

20. The write head of claim 16, wherein the second chromium layer is of a thickness that is up to 20 Angstroms.

21. A magnetic media drive comprising the write head of claim 16.

* * * * *